United States Patent [19]

Legrand et al.

[11] Patent Number: 4,798,710

[45] Date of Patent: Jan. 17, 1989

[54] PROCESS FOR THE MANUFACTURE OF A POWDER FOR CERAMIC MATERIALS, CONTAINING AT LEAST ONE METAL OXIDE

[75] Inventors: Franz Legrand, Quaregnon; Patricia De Bruycker, Brussels, both of Belgium

[73] Assignee: Solvay & Cie (Société Anonyme), Brussels, Belgium

[21] Appl. No.: 96,526

[22] Filed: Sep. 15, 1987

[30] Foreign Application Priority Data

Sep. 15, 1986 [FR] France .............................. 86 12968

[51] Int. Cl.$^4$ ............................................ C01G 25/02
[52] U.S. Cl. ...................................... 423/69; 423/592; 423/600; 423/608; 501/1; 501/94; 501/103; 501/152
[58] Field of Search ................... 501/1, 94, 103, 15 L; 423/69, 592, 600, 608

[56] References Cited

U.S. PATENT DOCUMENTS

| | | | |
|---|---|---|---|
| 4,542,112 | 9/1985 | Matsui et al. ...................... | 423/600 |
| 4,543,341 | 9/1985 | Barringer et al. ..................... | 501/1 |
| 4,574,078 | 3/1986 | Cortesi et al. ....................... | 423/592 |
| 4,678,657 | 7/1987 | Sood et al. .......................... | 423/600 |
| 4,741,894 | 5/1988 | Melas ................................. | 423/592 |

FOREIGN PATENT DOCUMENTS 0072995 3/1983 European Pat. Off. .

OTHER PUBLICATIONS

"Ceramics (Scope)", Kirk–Othmer Encyclopedia of Chemical Technology, 3rd Ed., vol. 5, John Wiley & Sons, N.Y.

Fegley et al., "Synthesis, Characterization, and Processing of Monosized Ceramic Powders," Materials Research Society Symposia Proceedings, vol. 32, 1984, pp. 187–196, Elsevier Science Publishing Inc.

Primary Examiner—Mark L. Bell
Assistant Examiner—David M. Brunsman
Attorney, Agent, or Firm—Spencer & Frank

[57] ABSTRACT

A metal alcoholate is treated with a quantity of water such that the molar ratio of the quantity of water to the quantity of metal alcoholate is lower than the valency of the metal in the alcoholate.

7 Claims, 3 Drawing Sheets

PROCESS FOR THE MANUFACTURE OF A POWDER FOR CERAMIC MATERIALS, CONTAINING AT LEAST ONE METAL OXIDE

FIELD OF THE INVENTION

The invention relates to the manufacture of ceramic materials.

It relates more particularly to a process for the manufacture of metal oxide powders intended for use in ceramic materials.

TECHNOLOGY REVIEW

It is well kwown that metal oxide powders can be prepared by the hydrolysis of metal alcoholates. To this end, a dilute solution of a metal alcoholate in an alcohol is generally prepared and an alcoholic solution of water is poured into it. The reaction is generally performed under an inert nitrogen atmosphere, at ambient temperature. At the end of the process, the metal oxide powder which has precipitated is collected (Better Ceramics Through Chemistry - Materials Research Society Symposia Proceedings - Vol. 32 - 1984 - Elsevier Science Publishing Co., Inc. - Bruce Fegley et al. : "Synthesis, characterization, and processing of monosized ceramic powders", pages 187 to 197).

The hydrolysis of the metal alcoholates according to this known process is generally summarized by a simplified hypothetical scheme comprising the formation of an intermediate hydroxyl product and the conversion of this intermediate product into the metal oxide, according to the following reactions:

$$M(OR)_n + nH_2O \longrightarrow M(OH)_n + nROH \quad (1)$$
$$M(OH)_n \longrightarrow MO_{n/2} + n/2\, H_2O \quad (2)$$
$$\overline{M(OR)_n + n/2\, H_2O \longrightarrow MO_{n/2} + nROH}$$

where
M denotes a metal,
R denotes a hydrocarbon group,
n is a number equal to the valency of the metal M in the alcoholate $M(OR)_n$.
(Materials Sciences and Engineering, 78 (1986). A. van Zyl et al., "A chemical reactor system for $TiO_2$ and $ZrO_2$ Powder Synthesis" - pages 217 to 222 (pages 218 and 219)).

In general, the metal oxide powders collected at the end of the known process described above contain agglomerates, their particle size distribution is dispersed and the particles are of irregular shape, which is disadvantageous for the manufacture of ceramic materials.

SUMMARY OF THE INVENTION

The invention is aimed at overcoming these disadvantages. To this end, it has been found that, by appropriately selecting the quantity of water employed to hydrolyse the metal alcoholates, it is possible to produce metal oxide powders in the form of uniform spherical particles in which the agglomerates are greatly reduced or even nonexistent and whose particle size distribution is relatively narrow.

Consequently, the invention relates to a process for the manufacture of a powder for ceramic materials, containing at least one metal oxide, in which at least one metal alcoholate is hydrolysed; according to the invention, in order to hydrolyse the metal alcoholate, the latter is treated with a quantity of water such that the molar ratio of the quantity of water to the quantity of alcoholate is lower than the valency of the metal in the alcoholate.

DESCRIPTION OF THE PREFERRED EMBODIMENTS

Within the scope of the invention, the term ceramic materials is intended to refer to nonmetallic inorganic materials whose application, starting with a powder, requires high temperature treatments such as melting or sintering treatments (P. William Lee - "Ceramics"- 1961 - Reinhold Publishing Corp. - page 1; Kirk-Othmer Encyclopedia of Chemical Technology - third edition - volume 5 - 1979 - John Wiley & Sons, USA - pages 234 to 236 : "Ceramics, scope").

In the process according to the invention, the metal alcoholate denotes any compound in which a metal is linked via an oxygen atom to a hydrocarbon group such as an aromatic group or a saturated or unsaturated, unsubstituted or partially or completely substituted, linear, branched or cyclic aliphatic group. Metal alcoholates containing aliphatic groups are especially recommended; preference is given to those containing unsubstituted saturated aliphatic groups such as, for example, the methyl, ethyl, n-propyl, isopropyl, n-butyl and isobutyl groups. Contact between the alcoholate and moisture should be avoided before the hydrolysis water is added to it in accordance with the invention.

According to the invention, in order to hydrolyse the alcoholate, a quantity of water is added to it such that the molar ratio of this quantity of water to the quantity of metal alcoholate is lower than the number n denoting the valency of the metal M in the metal alcoholate in the chemical equations (1) and (2) described above. The optimum quantity of water to be used depends on various parameters, particularly on the metal in the alcoholate, on the hydrocarbon group in the alcoholate and on the desired size of the metal oxide particles. It has been found, in fact, that it is possible, within certain limits, to modify the mean diameter of the metal oxide particles produced by modifying the abovementioned molar ratio. As a general rule, a molar ratio which is less than 0.95 times the valency of the metal in the metal alcholate is chosen, molar ratios of between 0.5 and 0.9 times this valency being the most appropriate.

Figure 2:
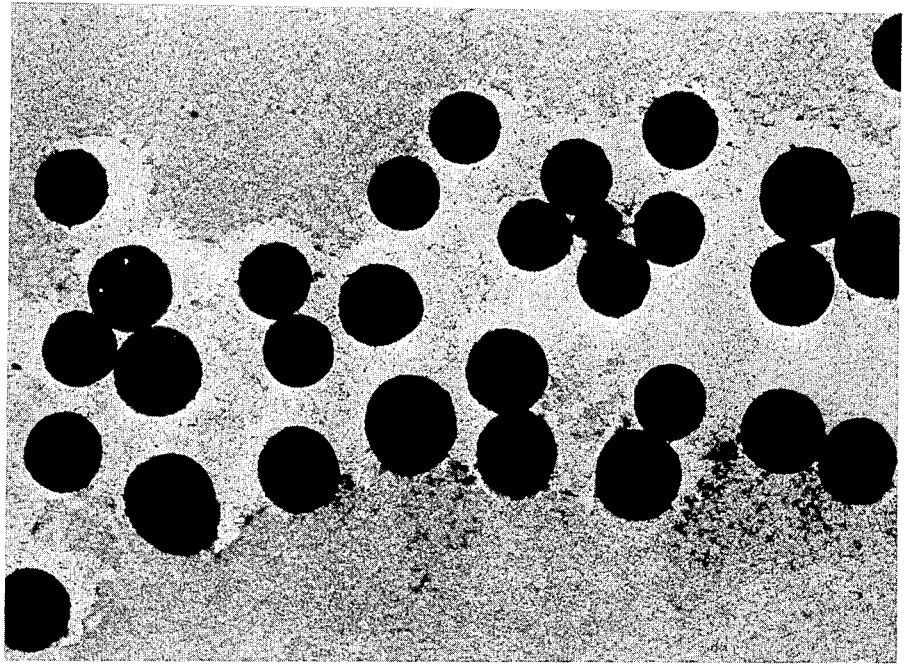
FIGS. 1-5 illustrate photomicrographs of zirconia powders obtained by examples 1-5, respectively.

In the process according to the invention, the hydrolysis may be performed in the surrounding air. However, in order to avoid the risk of an uncontrolled decomposition of the metal alcoholate, it is preferable to perform it under a moisture-free gas atmosphere. Dry, dehydrated air, nitrogen and argon are examples of atmospheres which can be employed according to the invention. It is desirable, furthermore, that the reaction mixture should be free from basic or acidic compounds.

As a rule, the temperature and the pressure are not critical. In the majority of cases it is generally possible to operate at ambient temperature and at normal atmospheric pressure.

In implementing the process according to the invention it is recommended to produce a homogeneous mixture of the alcoholate with water as quickly as possible after the addition of the water to the alcoholate, before nucleation commences. To this end, the alcoholate and the water are advantageously used in the form of organic solutions. Where appropriate, it is convenient for the organic solvent for the alcoholate to be free from water. Identical or different organic solvents may be employed for, on the one hand, the alcoholate and, on the other hand, the water. In the case where the alcoholate and the water are dissolved in different organic solvents, it is generally appropriate to choose organic solvents which are miscible. Alcohols and their derivatives are generally suitable, particularly methanol, ethanol, n-propanol, isopropanol, n-butanol and isobutanol.

The optimum dilution ratios of the alcoholate and of the water in their respective organic solvents depend on various factors, particularly on the alcoholate used, on the operating temperature, the degree of turbulence of the reaction mixture and the desired quality of the metal oxide powder; they need to be determined by routine laboratory work in each individual case. As a general rule, it is recommended that the organic solution of the alcoholate and the organic solution of water contain less than 2 moles of metal alcoholate per liter and less than 5 moles of water per liter, respectively. Molar concentrations which are especially advantageous are those between 0.05 and 1 in the case of the metal alcoholate solution and between 0.1 and 3 in the case of the organic water solution.

In the process according to the invention, the water intended for the hydrolysis may be added to the metal alcoholate in a single operation.

In a modified embodiment of the process according to the invention, the quantity of water intended for the hydrolysis is added to the alcoholate in two successive stages. To this end, in a first stage, a fraction of the quantity of water is added to the alcoholate, the resultant reaction mixture is subjected to a maturation process and then, in a second stage, the remainder of the total quantity of water is added to it. In this embodiment of the process according to the invention, the first stage and the maturing are intended to produce seeding of the metal oxide before the second stage. To this end, the fraction of water in the first stage is generally between 45 and 85% of the total quantity of water used in the two stages; fractions of water of between 60 and 80% of the total quantity of water are preferred. The addition of water in the first stage should be performed so as to produce a homogeneous mixture of the alcoholate with the water before the seed formation commences. The maturing period should be adjusted to permit the formation of metal oxide seeds, while avoiding substantial growth of these seeds. It depends on various parameters, particularly on the nature of the metal alcoholate used, on the working temperature and on the fraction of water employed in the first stage of hydrolysis. In each individual case it must be determined by routine laboratory tests. In practice, it is set at between a few seconds and 120 minutes, depending on the working temperature which is chosen. Maturing periods which do not exceed 60 minutes are usually needed when the maturation is carried out at ambient temperature between 15° and 25° C.; maturing periods of between 1 and 30 minutes are the most common.

The metal oxide produced as a result of the process according to the invention is generally in a hydrated amorphous state and is in the form of a powder consisting of fine, generally spherical particles whose diameter does not exceed 5 microns and is usually between 0.05 and 2 microns.

If desired, the powder may be subjected to a drying operation and a heat treatment at an appropriate temperature, in order to remove organic residues, water and the organic solvents with which it is impregnated. The heat treatment may be adjusted in order to control the porosity or to get rid of it completely. It may, furthermore, be adjusted in order to produce crystallization of the metal oxide powder.

The process according to the invention is equally applicable to the hydrolysis of a single metal alcoholate and to the cohydrolysis of several alcoholates of different metals, in order to produce, in this case, mixed metal oxide powders. It is especially suitable for the hydrolysis of alcoholates of metals belonging to Groups III and IV of the Periodic Table of the elements, such as, for example, silicon, aluminium and zirconium. It finds an especially advantageous application the production of powdered silica, alumina and zirconia, and most especially in the production of powdered mixtures of zirconia and yttrium oxide.

The invention consequently also relates to powders containing at least one metal oxide, produced by the process according to the invention and consisting of spherical particles whose diameter does not exceed 5 microns and is preferably between 0.5 and 2 microns.

A few examples whose description will follow are used to illustrate the invention. These examples are given with reference to the attached figures, which are five photographic reproductions of zirconia powders, at a magnification of 20,000x.

EXAMPLE 1

(according to the invention)

Figure 1:
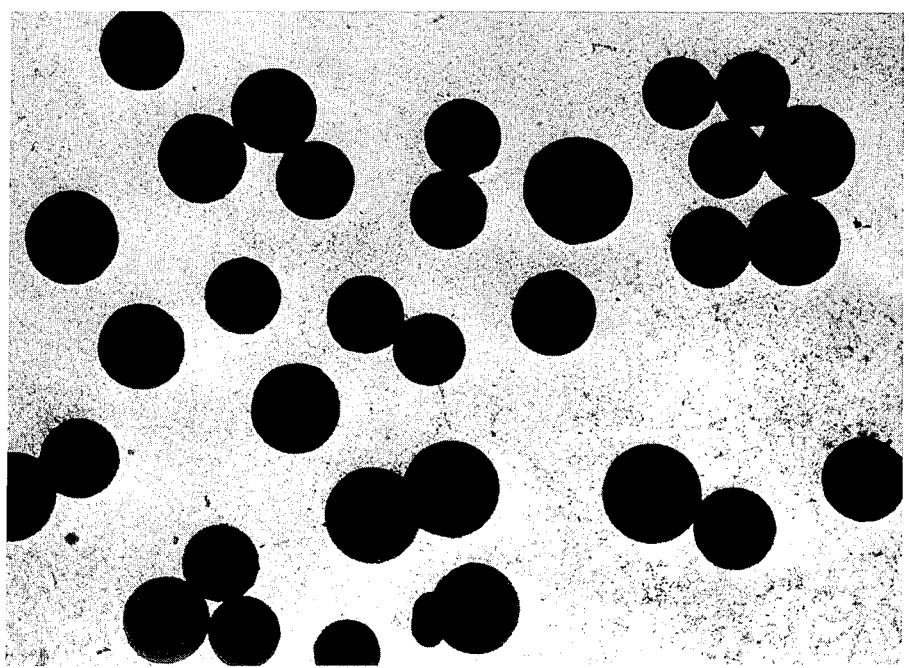

100 ml of a 0.2 M solution of zirconium (IV) n-butoxide in ethanol were introduced into a reaction chamber maintained under a dry nitrogen atmosphere at 25° C. 100 ml of a 0.4 m solution of water in ethanol were added in a single operation to this solution, while the latter was kept vigorously stirred; this corresponds to a water:zirconium butoxide molar ratio of 2 (which corresponds to 0.5 times the valency of zirconium). The reaction mixture was then subjected to maturing for 2 hours, with slow stirring. At the end of the maturation, the zirconia powder produced was collected and was dried with a stream of air at ambient temperature. The zirconia powder obtained is shown in FIG. 1.

EXAMPLE 2

(according to the invention)

The method was as in Example 1, the only exception being that the maturing period was 16 hours. Furthermore, the zirconia powder collected at the end of the maturation was washed with anhydrous ethanol and then dried with a stream of dry nitrogen at ambient temperature.

The zirconia powder obtained is shown in FIG. 2.

EXAMPLE 3

(according to the invention)

Using the method of Example 1, 60 ml of a 0.7 M solution of water in ethanol were added to 100 ml of a 0.2 M solution of zirconium (IV) n-butoxide. The reaction mixture was subjected to maturing for 140 seconds with slow stirring. 40 ml of the abovementioned water solution were then added to it in a single operation and with vigorous stirring and the reaction mixture was subjected to maturing for 2 hours with slow stirring. The molar ratio of the total quantity of water to the quantity of zirconium butoxide was 3.5, i.e. 0.875 times the valency of zirconium.

Figure 3:
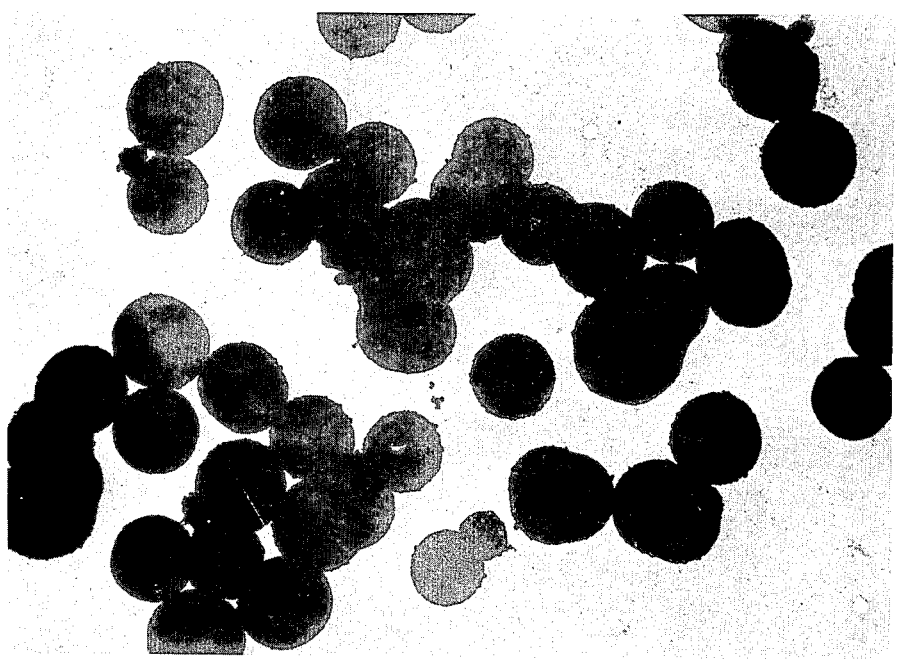

At the end of the maturation, the procedure followed was as in Example 2. The zirconia powder obtained is shown in FIG. 3.

EXAMPLE 4

(reference)

By way of comparison, hydrolysis of zirconium (IV) alcoholate was carried out using quantities of water and zirconium alcoholate which are in a molar ratio which is higher than 4 (valency of zirconium).

To this end, using the method of Example 1, 100 ml of a 0.5 M solution of water in ethanol were added in a single operation to 100 ml of a 0.09 M olution of zirconium (IV) n-propoxide in ethanol, which corresponds to a water:zirconium propoxide molar ratio of 5.6 (or 1.4 times the valency of zirconium).

The reaction mixture was subjected to maturing for 2 hours with slow stirring.

Figure 4:
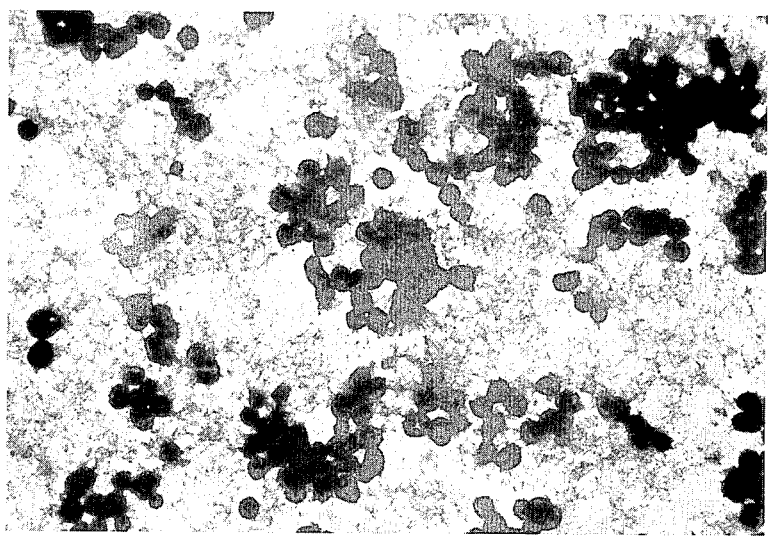

FIG. 4 shows a sample of the zirconium oxide powder collected at the end of the maturation.

Figure 5:
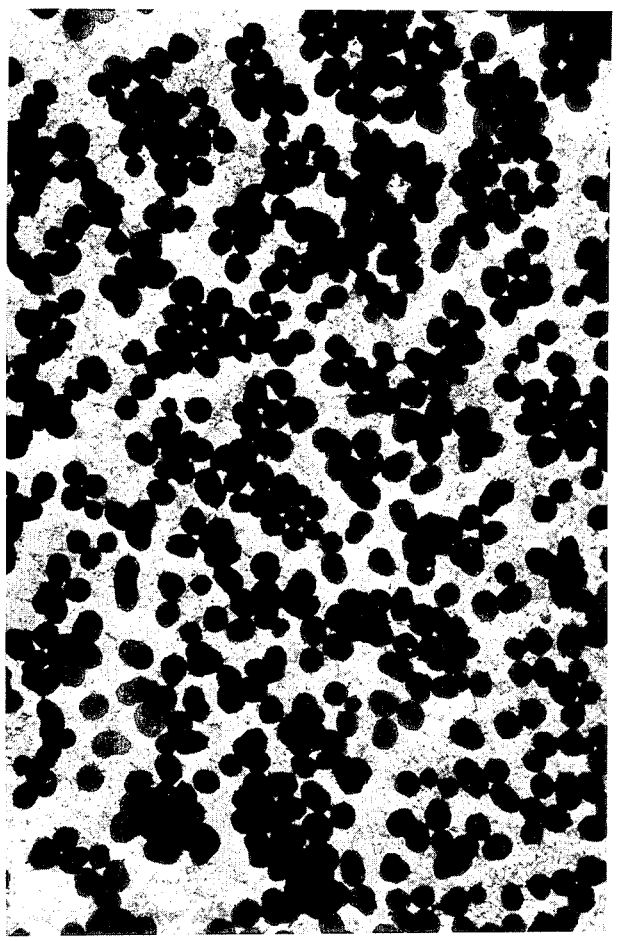

FIG. 5 shows another sample of the powder, after the latter had been washed with anhydrous ethanol and then dried in a stream of air at ambient temperature.

A comparison of FIGS. 4 and 5 with FIGS. 1, 2 and 3 shows the progress contributed by the invention insofar as the absence of agglomerates and the uniform, spherical form of the zirconium oxide particles are concerned.

We claim:

1. A process for the manufacture of a powder for ceramic materials, said powder containing at least one metal oxide, comprising the steps of treating an organic solution of at least one metal alcoholate with water under conditions adapted to precipitate at least one metal oxide as a powder, said step of treating including a first stage where a fraction of the quantity of water is added to the alcoholate with the resultant reaction mixture being subjected to maturing, and a second stage where the remainder of the quantity of water is added to the mixture; and collecting said powder, wherein the molar ratio of the quantity of water to the quantity of metal alcoholate employed is between about 0.5 and about 0.95 times the valency of the metal in the metal alcoholate.

2. Process according to claim 1, characterized in that the maturing period is adjusted to avoid precipitation before the second stage.

3. Process according to claim 1, characterized in that the fraction of water in the first stage is between 60 and 80% of the total quantity of water used.

4. Process according to claim 1, characterized in that the metal alcoholate and the water are used in the form of organic solutions.

5. Process according to claim 4, characterized in that an alcoholic solution of the alcoholate containing between 0.5 and 1 mole of alcoholate per litre and an alcoholic solution of water containing between 0.1 and 3 moles of water per litre are used.

6. Process according to claim 1, characterized in that at least one alcoholate of a metal belonging to Group III or IV of the Periodic Table of the elements is chosen.

7. Process according to claim 6, characterized in that a mixture of zirconium alcoholate and yttrium alcoholate is used.

* * * * *